United States Patent
Tanaka et al.

(10) Patent No.: US 8,862,331 B2
(45) Date of Patent: Oct. 14, 2014

(54) CONTROLLER FOR STEERING APPARATUS

(71) Applicant: JTEKT Corporation, Osaka (JP)

(72) Inventors: Eiji Tanaka, Kitakatsuragi-gun (JP); Tomihide Masuda, Miyoshi (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/652,912

(22) Filed: Oct. 16, 2012

(65) Prior Publication Data

US 2013/0110353 A1 May 2, 2013

(30) Foreign Application Priority Data

Oct. 26, 2011 (JP) ................................. 2011-235233
Dec. 26, 2011 (JP) ................................. 2011-284354

(51) Int. Cl.
*B62D 1/187* (2006.01)
*B62D 1/181* (2006.01)

(52) U.S. Cl.
CPC ..................................... *B62D 1/181* (2013.01)
USPC ........ 701/44; 701/42; 701/1; 701/36; 701/41; 180/6.2; 180/78; 180/400; 180/449

(58) Field of Classification Search
CPC ...................................................... B62D 1/181
USPC ............. 180/6.2, 78, 400–449; 701/1, 36, 41, 701/44, 42
See application file for complete search history.

(56) References Cited

U.S. PATENT DOCUMENTS

| | | | | | |
|---|---|---|---|---|---|
| 4,503,504 A | * | 3/1985 | Suzumura et al. | ............... | 701/49 |
| 4,752,085 A | * | 6/1988 | Yamamoto | .................... | 280/775 |
| 4,934,737 A | * | 6/1990 | Nakatsuka | .................... | 280/775 |
| 4,978,137 A | * | 12/1990 | Futami et al. | ................. | 280/775 |
| 5,048,364 A | * | 9/1991 | Minamoto et al. | ............... | 74/493 |
| 5,485,376 A | * | 1/1996 | Oike et al. | ....................... | 701/41 |
| 6,390,505 B1 | * | 5/2002 | Wilson | ........................... | 280/775 |
| 6,671,598 B2 | * | 12/2003 | Laurent | ........................... | 701/41 |
| 7,178,613 B2 | * | 2/2007 | Yanaka et al. | ............... | 180/6.32 |
| 7,455,319 B2 | * | 11/2008 | Haglund et al. | ............... | 280/775 |
| 2008/0128197 A1 | * | 6/2008 | Kawaguchi et al. | .......... | 180/444 |
| 2009/0051303 A1 | * | 2/2009 | Holloway | ...................... | 318/280 |
| 2010/0036560 A1 | * | 2/2010 | Wright et al. | .................... | 701/36 |
| 2012/0053794 A1 | * | 3/2012 | Alcazar et al. | .................. | 701/48 |
| 2013/0275010 A1 | * | 10/2013 | Kouchi | ........................... | 701/49 |

FOREIGN PATENT DOCUMENTS

| | | |
|---|---|---|
| DE | 42 17664 A1 | 12/1992 |
| EP | 1 927 526 A1 | 6/2008 |
| EP | 2 657 103 A1 | 10/2013 |
| JP | A-2000-002503 | 1/2000 |
| JP | A-2010-000840 | 1/2010 |
| WO | WO 2012/086677 | 6/2012 |

OTHER PUBLICATIONS

Jan. 3, 2014 European Search Report issued in European Patent Application No. 12188950.5.

\* cited by examiner

*Primary Examiner* — Calvin Cheung
*Assistant Examiner* — Allen E Quillen
(74) *Attorney, Agent, or Firm* — Oliff PLC

(57) ABSTRACT

It is an object of the present invention to provide a controller for a steering apparatus having easy operation of an adjustment of a tilting angle.
The steering apparatus comprises a tilting mechanism adjusting a tilting angle of a steering wheel, and an electrical motor driving the tilting mechanism. The controller for the steering apparatus 1 detects the tilting angle based on a rotational angle of the screw shaft. The controller defines the predetermined supplying current according to the detected amount of the tilting angle as the supplying current to the electrical motor.

5 Claims, 10 Drawing Sheets

CONTROLLER FOR STEERING APPARATUS

INCORPORATION BY REFERENCE

The present application claims priority under 35 U.S.C. §119 to Japanese Patent Applications No. 2011-235233, filed on Oct. 26, 2011 and No. 2011-284354, filed on Dec. 26, 2011. The content of these applications are incorporated herein by reference in the entirety.

BACKGROUND OF THE INVENTION

1. Field of the Invention

The present invention relates to a controller for a steering apparatus having a tilting mechanism adjusting a tilting angle of a steering wheel and an electrical motor driving the tilting mechanism to control a current supplied to the electrical motor.

2. Description of the Related Art

A controller for a steering apparatus adjusting a tilting angle by driving an electrical motor in accordance with an operation of the tilting switch is well known in the prior art as disclosed by Japanese laid-open publication Tokkai 2010-840.

In general, an amount of force applied to the tilting mechanism by rotation of the electrical motor is variable depending on a tilting angle. Therefore, there is a difference between an operating velocity of the tilting mechanism at the beginning of adjusting the tilting angle by a driver and an operating velocity of the tilting mechanism during adjusting after that.

The driver tends to stop the adjustment of the tilting angle when the driver reaches a desired tilting angle during the tilting adjustment. However because of the previous-mentioned differences, it is difficult to stop instruction of the adjustment for the tilting angle at an instance of the desired tilting angle when the operating velocity of the tilting mechanism is increased.

SUMMARY OF THE INVENTION

In view of the previously mentioned circumstances, it is an object of the present invention to provide a controller for a steering apparatus having easy operation of an adjustment of a tilting angle.

In order to achieve the above and other objects, one aspect of the present invention provides a controller for a steering apparatus wherein the steering apparatus comprises a tilting mechanism adjusting a tilting angle of a steering wheel and an electrical motor driving the tilting mechanism, the controller includes an arithmetic member defining a predetermined relationship between the tilting angle and a supplying current to the electrical motor, and the controller controls the supplying current to the electrical motor by using the arithmetic member. Since the present invention controls the motor current of the electrical motor by using the predetermined relationship between the tilting angle and the motor current of the electrical motor, it can control the operating velocity of the tilting mechanism in accordance with the tilting angle. By the way that it decides the predetermined relationship so as to not generate any variation of the operating velocity of the tilting mechanism which causes difficulty in adjustment, it can achieve easy operation to adjust the tilting angle may be achieved. Since it controls the motor current of the electrical motor on a basis of the predetermined relationship, it can reduce a calculating load of the electronic controller in comparison with the construction of the prior art which controls a motor current of an electrical motor by a feedback control.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

A preferred embodiment of a controller for a steering apparatus according to the present invention will be described with reference to FIGS. 1-12. The controller for the steering apparatus according to the present invention controls a current supplied to an electrical motor that drives a tilting mechanism to adjust a tilting angle of a steering wheel of the steering apparatus. The tilting mechanism will be explained first with reference to FIGS. 1-5.

Figure 1:
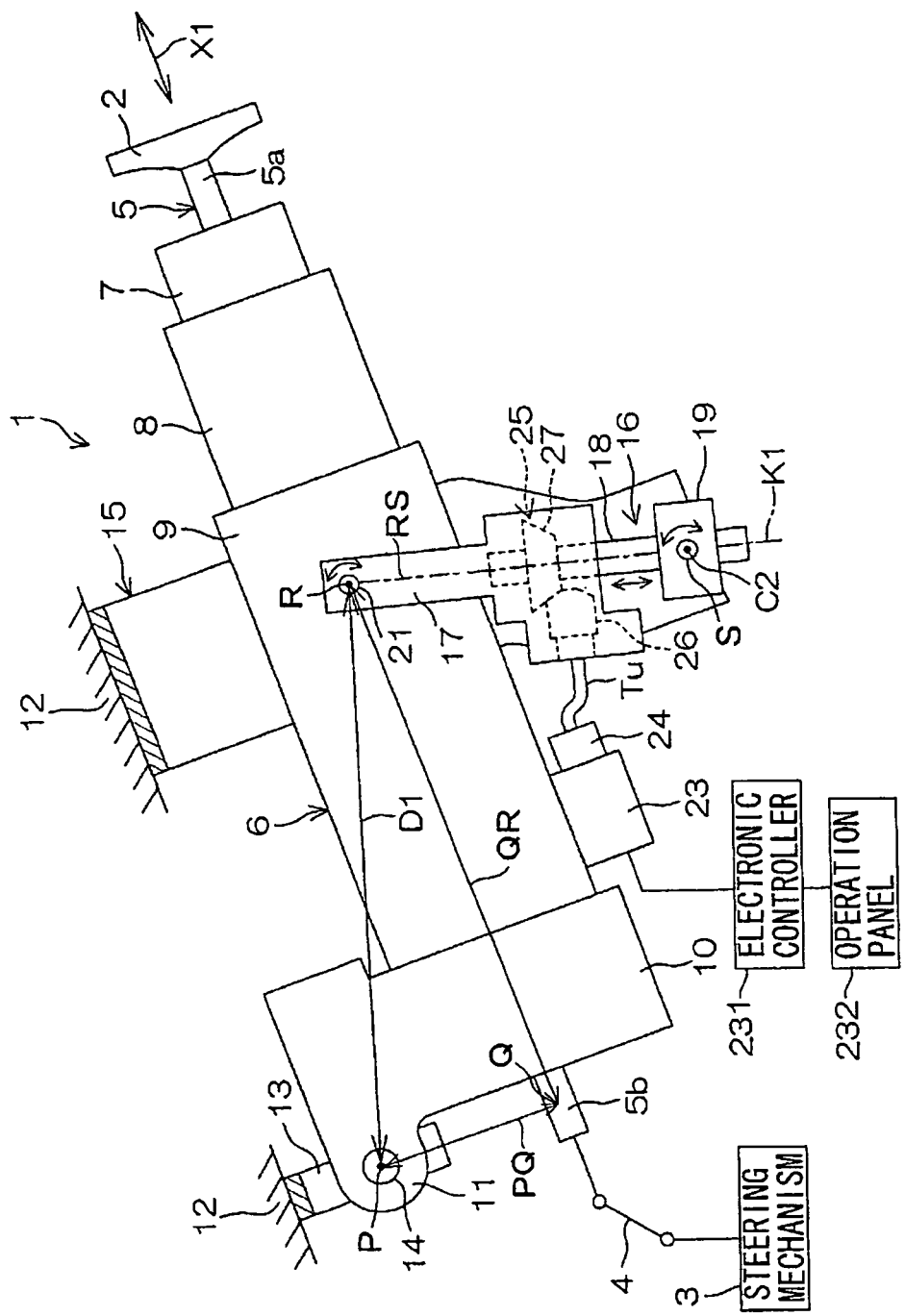
FIG. 1 is a schematic diagram of one example of a steering apparatus relating to the present invention.

FIG. 1 shows a schematic diagram of the tilting mechanism of the steering apparatus 1. The steering apparatus 1 includes a steering member 2 of a steering wheel etc., a steering mechanism 3 of a rack and pinion mechanism etc., a steering shaft 5 connected to the steering member 2 to transmit a rotation of the steering member 2 through an intermediate shaft 4 to the steering mechanism 3, and a hollow cylindrical steering column 6 supporting rotatably the steering shaft 5 through un-illustrated bearings.

The steering column 6 includes an upper tube 7, an intermediate tube 8 fitted into an outer peripheral surface of the upper tube 7, and a housing 10 formed as a whole with a lower tube 9 fitted into an outer peripheral surface of the intermediate tube 8. The steering apparatus 1 includes an un-illustrated power assisted mechanism as a power steering apparatus. In the housing 10 is accommodated an un-illustrated transmitting mechanism of a worm gear mechanism etc. transmitting power from an un-illustrated electrical motor of the power steering mechanism to the steering shaft 5.

The steering apparatus 1 includes an electrical tilting mechanism adjusting a tilting position of the steering member 2. The steering apparatus 1 also includes an electrical telescoping mechanism adjusting a telescoping position of the steering member 2 and the telescoping mechanism is not illustrated.

The steering column 6 is rotatably supported around a tilting axis P for the tilting movement at a lower part of the steering column 6 along an axial direction X1. A supported portion 11 of the steering column 6 extending from the housing 10 is rotatably supported through a pivot shaft 14 by a fixing bracket 13 anchored on a vehicle body 12 for the tilting movement. Therefore, a center line of the pivot shaft 14 is the tilting axis P.

The steering column 6 is connected at its middle part through a connecting mechanism 16 to a fixed bracket 15 anchored to the vehicle body 12. The connecting mechanism 16 includes a cradle 17, a screw shaft 18 as a first member, and a nut 19 as a second member engaging in mesh with the screw shaft 18. The screw shaft 18 as the first member engages with the nut 19 as the second member along a common axis K1. The common axis K1 extends to intersect with the axis X1 of the steering column 6.

The cradle 17 is swing-ably connected to the steering column 6 around a first axis R parallel to the tilting axis P. The first axis R corresponds to an axis of first supporting shafts 21 attached to the lower tube 9 of the steering column 6 at both ends of the lower tube 9 and penetrating through the cradle 17. The first supporting shafts 21 are screwed into screw holes 40 of the cradle 17 and are made of a bolt 21a and a cylindrical portion 21b, the of tops of which are fit into supported portions 41 formed at both ends of the lower tube 9. The cradle 17 is connected with the lower tube 9 in a pivoting way through the first supporting shafts 21.

The screw shaft 18 as the first member is rotatably supported around the common axis K1 without axial movement along the common axis K1. The screw shaft 18 is swing-able around the first axis R with the cradle 17 in accordance with the swing of the cradle 17. The axial movement of the screw shaft 18 is restricted along the common axis K1 relative to the cradle 17.

The nut 19 as the second member is swing-ably supported by the fixing bracket 15 around a second axis S parallel to the tilting axis P. The second axis S corresponds to a center axis of second supporting shafts 22 mounted on the fixed bracket 15.

The second supporting shafts 22 are screwed into a pair of screw holes 34 formed in the fixed bracket 15 and are made of a bolt 22b and cylindrical portions 22a, of tops of which are penetrated through the fixed bracket 15 and are fit into a supporting portion 35 formed at both ends of the nut 19. The nut 19 is connected with the fixed bracket 15 in a pivoting way through the second supporting shafts 22.

The nut 19 is restricted by the second supporting shafts 22 from rotating around the common axis K1. The second supporting shafts 22 also operate as a second restricting member to restrict an axial movement of the nut 19 along the common axis K1.

Electrical tilting function of the steering apparatus 1 will be performed as follows. Rotating drive force of the electrical motor 23 fixed to the lower tube 9 of the steering column 6 is transmitted through an switching mechanism 24 fixed to the lower tube 9, a flexible drive transmitting tube Tu, a reduction mechanism 25 supported by the cradle 17 to the screw shaft 18 to rotate the screw shaft 18. The screw shaft 18 is moved along the common axis K1 in accordance with the rotation of the screw shaft 18 with respect to the nut 19, thereby changing a distance between the first supporting shafts 21 and the second supporting shafts 22. The distance between the first supporting shaft 21 and the second supporting shaft 22 corresponds to a distance between the first axis R and the second axis S. By this way the tilting angle of the steering column 6 is adjusted to achieve the tilting adjustment.

The switching mechanism 24 functions to switch the drive force of the electrical motor 23 to the screw shaft 18 to achieve the electrical tilting function or to the telescopic function of the un-illustrated electrical telescopic mechanism selectively.

The reduction mechanism 25 includes a driving gear 26 supported rotatably by the cradle 17, and a driven gear 27 connected to the screw shaft 18 at its middle part to be rotated with the screw shaft 18 as a whole. The driving gear 26 and the driven gear 27 may be a pair of bevel gears intermeshed with each other.

Figure 2:
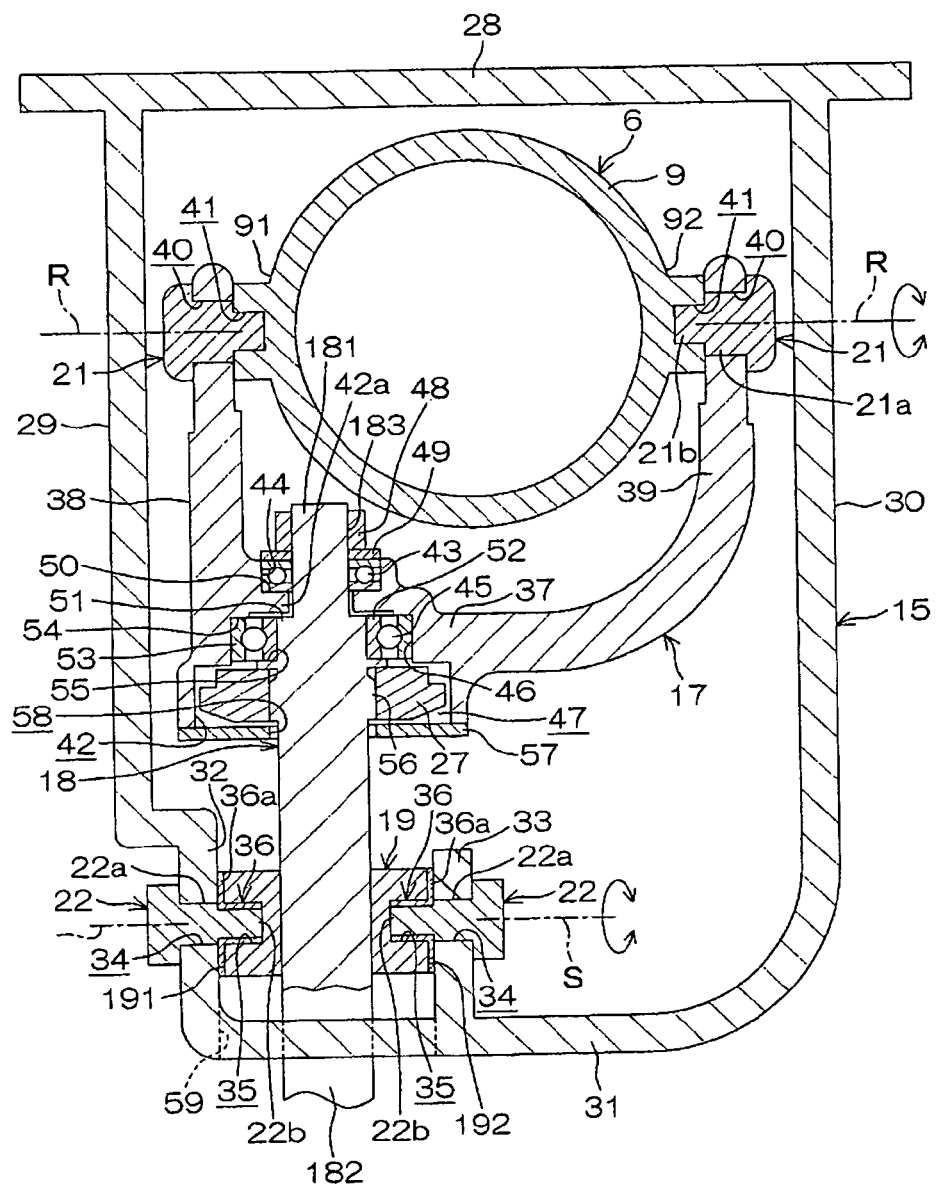
FIG. 2 is a schematic cross-sectional diagram of main parts of the steering apparatus.

As shown in FIG. 2, the fixed bracket 15 includes a top board 28 fixed to the vehicle body 12, a pair of side boards 29, 30 extending downwardly from the top board 28, and a bottom board 31 connecting each low ends of the pair of side boards 29, 30. The lower tube 9 of the steering column 6 is penetrated between the pair of side boards 29, 30 of the fixed bracket 15.

The nut 19 as the second member has a pair of parallel plane side parts 191, 192. One side part 191 of the nut 19 is opposite to an end surface of a boss 32 mounted on the one side board 29 of the fixed bracket 15 and the other side part 192 of the nut 19 is opposite to an end surface of a boss 33 mounted on the bottom board 31 of the fixed bracket 15.

Each of the second shafts 22 is constructed with a bolt having a screw portion 22a screwed into a screw hole 34 in each of the bosses 32, 33, and a cylindrical portion 22b extending from the screw portion 22a to a top end side. Each of cylindrical portion 22b penetrates through each of bosses 32, 33 to be entered into a supported hole 35 mounted in each of side parts 191, 192.

A bushing 36 is fit into an outer peripheral surface of the cylindrical portion 22b and an inner surface of the supported hole 35 respectively. The nut 19 is therefore connected swing-ably around the second axis S of the second supporting shafts 22 to the fixed bracket 15 through the bushing 36 and the second supporting shafts 22. Since flanges 36a mounted on one end of bushings 36 are exerted between end surfaces of the bosses 32, 33 corresponding to each of side parts 191, 192 of the nut 19, rotating resistance of the nut 19 against the second supporting shafts 22 is reduced more so that the nut 19 can rotate smoothly around the second axis S.

The cradle 17 includes a main body 37 supporting the screw shaft 18, and a pair of side boards 38, 39 extending from both sides of the main body 37 to corresponding sides 91, 92 of the lower tube 9. The screw hole 40 is formed in each of the side boards 38, 39. The supported hole 41 is formed in each of sides 91, 92 of the lower tube 9. Each of the first supporting shafts 21 is constructed with a bolt having the screw portion 21a screwed into the screw hole 40 of each of the side boards 38, 39, and the cylindrical portion 21b extending from the screw portion 21a to the top end side and being fit into the supported hole 41 of the corresponding sides 91, 92 of the lower tube 9.

In the main body 37 of the cradle 17,a penetrating hole 42 is formed extending along the common axis K1 of the screw shaft 18. The penetrating hole 42 includes a bearing supporting portion 44 having a small diameter, a bearing supporting portion 46 having a medium diameter, and a driven gear accommodating portion 47 having a large diameter. The small bearing supporting portion 44 holds a thrust bearing 43 such as a thrust ball bearing to support the screw shaft 18 in a thrust direction. The medium bearing supporting portion 46 holds a radial bearing 45 such as a radial ball bearing to support the screw shaft 18 rotatably. The large driven gear accommodating portion 47 accommodates the driven gear 27 rotating with the screw shaft 18 as a whole.

A tightening nut 48 is screwed on a screw portion formed on an outer peripheral surface of a small shaft portion 183 in one end 181 of the screw shaft 18. The nut 19 for tilting is fit on other end 182 of the screw shaft 18. The tightening nut 48 pushes the thrust bearing 43 against a positioning step 50 formed on an end of the bearing supporting portion 44. A cylindrical portion 51 of the screw shaft 18 is fit into an inner race 52 of the radial bearing 45 to be rotated therewith. An outer race 53 of the radial bearing 45 is pressed into an inner periphery of the bearing supporting portion 46.

The outer race 53 of the radial bearing 45 engages with a positioning step 54 formed on an end of the bearing supporting portion 46. Thereby, the outer race 53 is restricted in its axial movement from moving toward the thrust bearing 43 shown in FIG. 2. The inner race 52 engages with a positioning step 55 of the screw shaft 18 adjacent to the cylindrical portion 51 of the screw shaft 18. Thereby, the inner race 52 is restricted in its axial movement from moving toward the driven gear 27 as shown in FIG. 2.

The thrust bearing 43 and the radial bearing 45 receive the force in a direction approaching each other in accordance with tightening by the tightening nut 48. Thereby, since a predetermined portion of the cradle 17 existing between both bearings 43, 45 is supported between the bearings 43, 45, the screw shaft 18 is restricted in its axial movement. The predetermined portion of the cradle 17 corresponds to an annular projection 42a formed between the bearing supporting members 44 and 46 within the inner peripheral surface of the penetrating hole 42. The tightening nut 48, the thrust bearing 43 and the radial bearing 45 function as a first restricting member restricting the movement of the screw shaft 18 along the common axis K1.

Since the bearings 43, 45 receive a predetermined value of pressurization in accordance with tightening by the tightening nut 48, back-lash of the screw shaft 18 in axial and radial directions relative to the cradle 17 is restricted.

A serrated portion 56 of the screw shaft 18 is fitted into an inner peripheral surface of the driven gear 27 to be rotated therewith. A cover 57 seals a lower portion of a driven gear accommodating portion 47 of the penetrating hole 42 of the main portion 37. The screw shaft 18 penetrates through a penetrating hole 58 of the cover 57.

Figure 3:
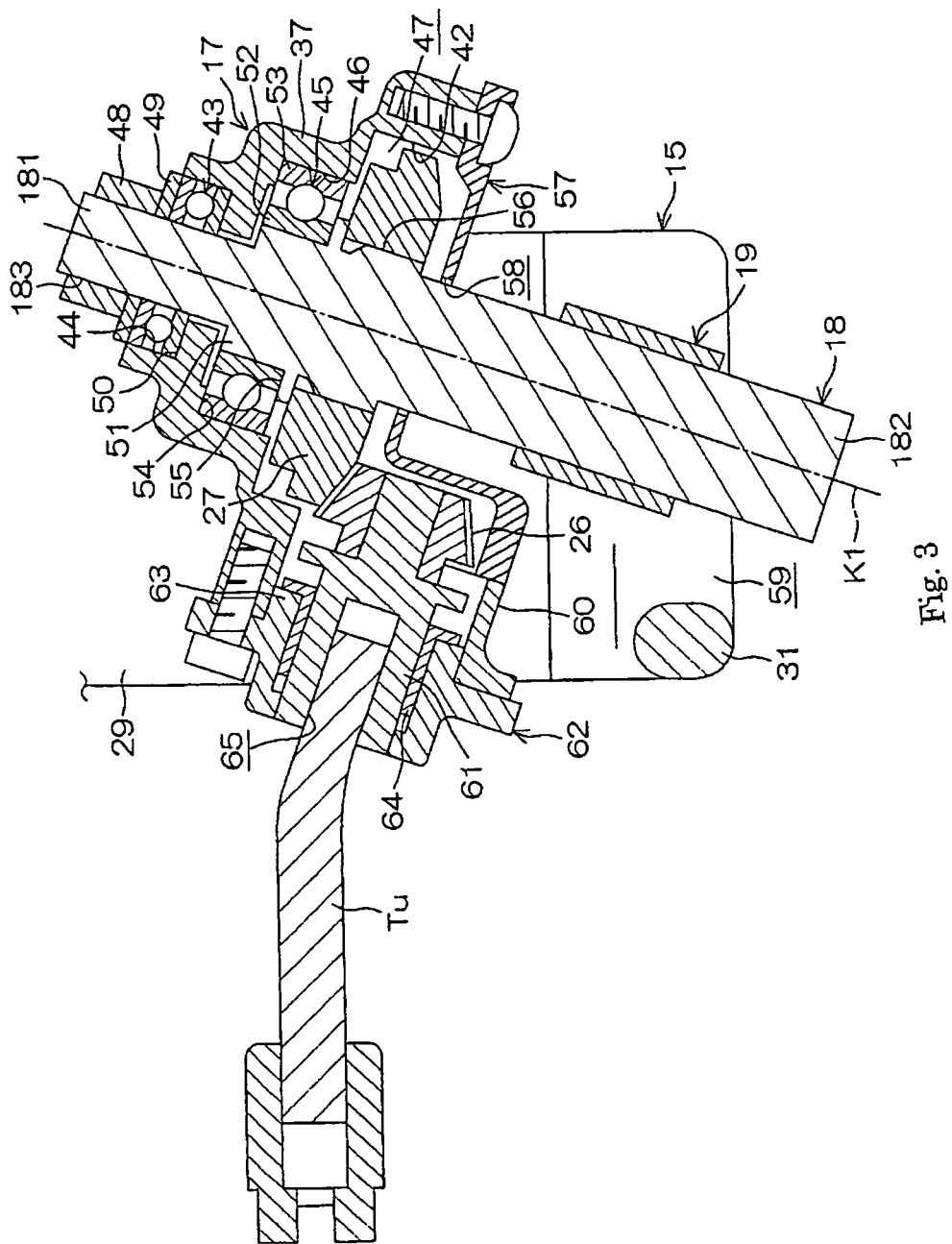
FIG. 3 is a schematic cross-sectional diagram of the main parts of the steering apparatus viewed from another angle.

The other end 182 of the screw shaft 18 penetrates through an undercut portion 59 of the bottom portion 31 as shown in FIG. 2 and FIG. 3.

In referring to FIG. 3, the main body 37 of the cradle 17 includes an extending hollow cylinder 60 extending along a transversal direction to the common axis K1 of the penetrating hole 42 through which the screw shaft 18 is penetrated. In the extending hollow cylinder 60 are installed the driving gear 26 engaging with the driven gear 27 and a supporting shaft 61 for the driving gear 26. A cup member 62 is fixed to an opening end of the extending hollow cylinder 60.

The supporting shaft 61 is rotatably supported through a bushing 64 by a hollow cylindrical portion 63 extending from the cup member 62. An end of the supporting shaft 61 is exposed to the outside from an opening of the cup member 62. At the end of the supporting shaft 61 is formed a connecting hole 65 connected to one end of a flexible power transmitting tube Tu for transmitting the power from the motor 23 controlled by a controller for the steering apparatus according to the present invention described herein later.

Since the screw shaft 18 as a first member and the nut 19 as the second member for the tilting adjustment are rotate-able around the first axis R and the second axis S respectively parallel to the tilting axis P, a distance D1 (see in FIG. 1) between the tilting axis P and the first axis R is not changeable in accordance with the change of the distance between the first axis R and the second axis S.

A steering apparatus with an electrical tilting mechanism to adjust a height position of a steering wheel by tilting a steering column supported swing-ably around a tilting axis by the way of an electrical motor as shown in Japanese laid open publication Tokkai 2000-2503 is well known. A lower end of the steering column of the above-identified well known steering apparatus is swing-ably supported at a vehicle body around a tilting axis. An upper portion of the steering column is tilted in electrical box supported rotatably by a fixed bracket. A screw shaft is supported rotatably in its rotating direction and non-movably in its axial direction and is engaged in mesh with an adjustable nut fixed to the steering column. The adjustable nut is moved along its axis in a way of driving the screw shaft by an electrical motor in order to tilt the steering column.

Movement of the steering column is in an arc around the tilting axis. On the other hand, movement of the screw shaft is linear along a centerline of the screw shaft. Because of the difference between these movements, and because a distance between the tilting axis and the adjusting nut is constant in the well known steering apparatus, there is possibility to make a load of the electrical motor in tilting larger, thereby making a size of the electrical motor larger.

Based on these possibilities, it may improve the well known steering apparatus to construct the lower tube of the steering column as a pair of tubes fit one into the other in a condition to move relative to each other in accordance with the tilting adjustment. However, it still remains the load of the electrical motor may become larger because of the frictional force generated between both tubes at the tilting adjustment. Therefore, it is an object of the steering apparatus 1 to make the electrical motor 23 small.

In contrast to the well known steering apparatus, the steering apparatus 1 having the above-mentioned construction has an effect that it can eliminate both of the relatively moveable tubes of the steering column in the well known steering apparatus at a lower portion of the steering column 6 along the axial direction X1. The steering apparatus 1, therefore, allows for a simpler construction because of the single lower tube 9 that does not expand and retract. Also, since there is no frictional force in accordance with the relative movement during a tilting adjustment, the load of the electrical motor is reduced to enable the size of the electrical motor 23 to become small.

The steering apparatus 1 can achieve the swing mechanism around the first axis R and the swing mechanism around the second axis S to be more simple because of the simple structure having the first shafts 21 penetrated through the cradle 17 and connected to the sides 91, 92 of the lower tube 9 and the second shafts 22 penetrated through the fixing bracket 15 to be connected to the side parts 191, 192 of the nut 19.

Figure 4:
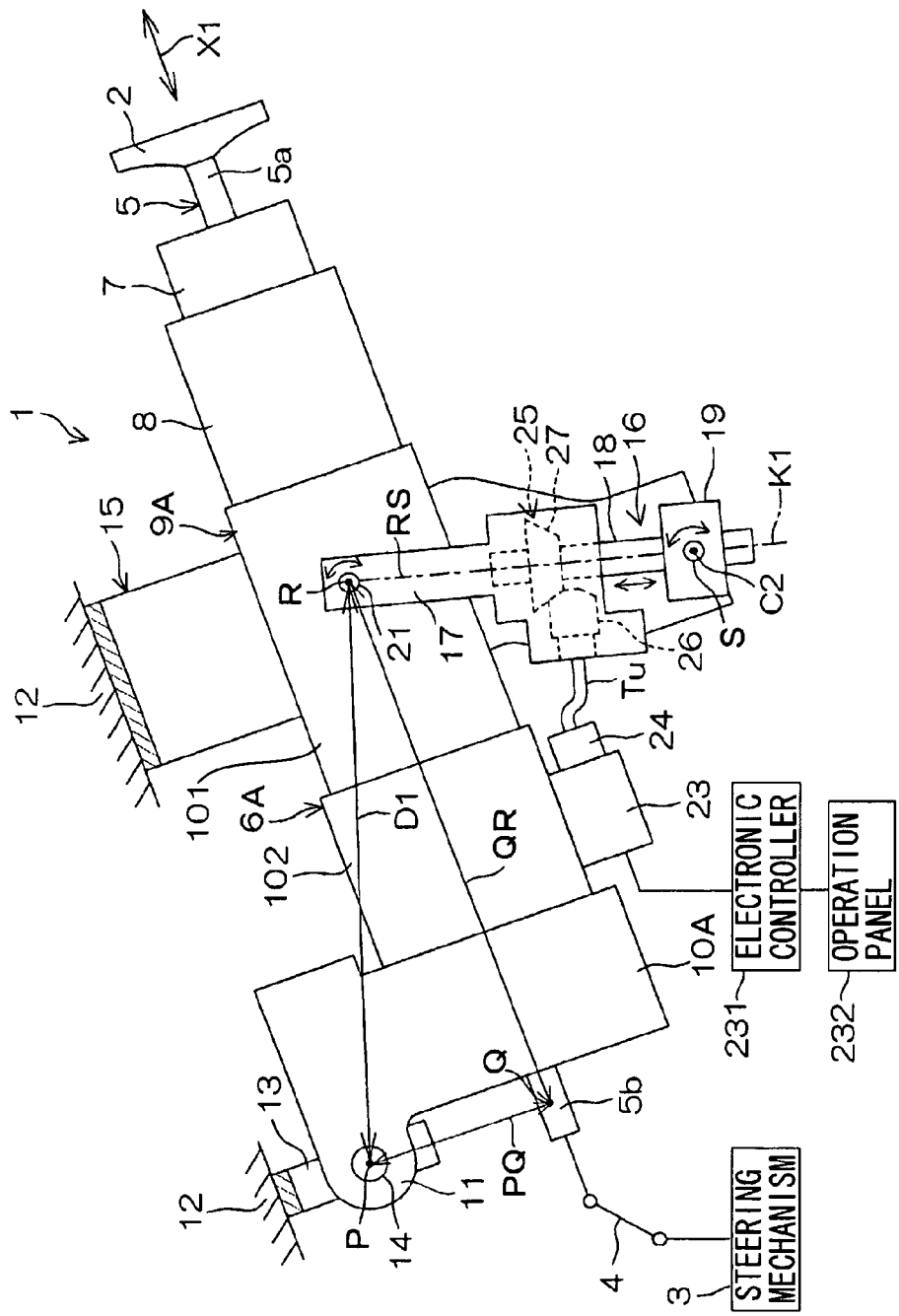
FIG. 4 is a schematic diagram of another example of a steering apparatus relating to the present invention.

Next, another embodiment of the steering apparatus 1A will be explained referring to FIG. 4. The differences of this embodiment as compared to that in FIG. 1 will be described. A lower tube 9A of a steering column 6A includes first column tube 101 connected with the first supporting shaft 21, and second column tube 102 fitted into the end of the first column tube 101 and formed with a housing 10A as a whole.

Both of the column tubes 101, 102 are normally prevented from relative axial movement by being pressed into with a predetermined value of pressure especially in a tilting adjustment, therefore the second embodiment of the steering apparatus is completely different from the well known steering apparatus having the pair of tubes. However the first column tube 101 of the steering apparatus 1A moves to enter into the second column tube 102 at a collision of the vehicle in order to absorb energy by the collision. Reference numbers in FIG. 4 that are the same as reference numbers in FIG. 1 show features that are unchanged from the embodiment shown in FIG. 1.

According to the above described embodiment of the steering apparatus 1A, since the lower tube 9A having the extending portion extending downwardly from the first supporting shafts 21 is divided into the first tube 101 and the second tube 102 to absorb the collision energy, it can expand various type of designs. There is no need to move the first tube 101 relative to the second tube 102 during the tilting adjustment which would generate friction. Thus, the load of the electrical motor 23 is not increased.

Next, a further embodiment of the steering apparatus 1B will be explained referring to FIG. 5. In each construction in FIG. 1 and FIG. 4, the first member supported by the cradle 17 is the screw shaft 18, and the second member supported by the fixed bracket 15 is the nut 19. On the other hand, in the steering apparatus 1B, the first member supported by the cradle 17B is the nut 19B, and the second member supported by the fixed bracket 15 is the screw shaft 18B.

In detail, the nut 19B as the first member is fixed to the cradle 17B by a welding portion 66. The other end 182 of the screw shaft 18B as the second member is meshed with the nut 19B. The welding portion 66 achieves a function as a first restricting member restricting axial movement of the nut 19B along the common axis K1 relative to the cradle 17B.

A supporting member 67 is rotatably supported around the second axis S by the supporting shafts 22 screwed into the screw holes 34 of the bosses 32, 33. One end 181 of the screw shaft 18B as the second member is rotatably supported in the rotational direction and non-movably supported in the axial direction by the supporting member 67. A supported hole 68 is formed at both end parts 671, 672 of the supporting member 67. A cylindrical portion 22b of the supporting portion 22 is inserted into the supported hole 68 through a bushing 36 covered over the cylindrical portion 22b.

In the supporting member 67 is formed a penetrating hole 72 extending along the common axis K1 of the screw shaft 18B. The penetrating hole 72 includes a bearing holding member 74 with a small diameter holding a thrust bearing 73 such as thrust ball bearing to support the screw shaft 18B in a thrust direction, and a bearing holding member 76 with a medium diameter holding a radial bearing 75 such as a radial ball bearing to support the screw shaft 18B rotatably.

A tightening nut 78 is engaged in mesh with a screw portion on outer peripheral surface of a cylindrical portion 183 of the one end 181 of the screw shaft 18B. The tightening nut 78 pushes the thrust bearing 73 through a washer 79 against the positioning step 80 mounted on the middle portion of the screw shaft 18B. A cylindrical portion 51 at the middle of the screw shaft 18B is fit into an inner race 82 of the radial bearing 75 to be rotated with the inner race 82 as a whole. An outer race 83 of the radial bearing 75 is fit into an inner peripheral surface of the bearing holding member 76.

The outer race 83 of the radial bearing 75 is abutted to a positioning step 84 mounted on an end portion of the bearing holding member 76. Thereby, axial movement of the outer race 83 is restricted downward in FIG. 5 toward the thrust bearing 73. Further, the inner race 82 is abutted to a positioning step 55 mounted adjacent to the cylindrical portion 51 of the screw shaft 18B. Thereby, axial movement of the inner race 82 is restricted upward in FIG. 5 toward the driving gear 27.

According to the above-mentioned further embodiment of the steering apparatus 1B, the thrust bearing 73 and the radial bearing 75 receive a force in a direction approaching each other through the screw shaft 18B in accordance with the tightening of the tightening nut 78. Thereby, since a predetermined portion of the supporting member 67 existing between both bearings 73, 75 is supported between the bearings 73, 75, is screw shaft 18B is restricted its axial movement. The predetermined portion of the supporting member 67 corresponds to an annular projection 72a formed between the bearing supporting members 74 and 76 within the inner peripheral surface of the penetrating hole 72. The tightening nut 78, the thrust bearing 73 and the radial bearing 75 function as a second restricting member restricting the movement of the screw shaft 18B along the common axis K1 relatively to the supporting member 67.

Figure 5:
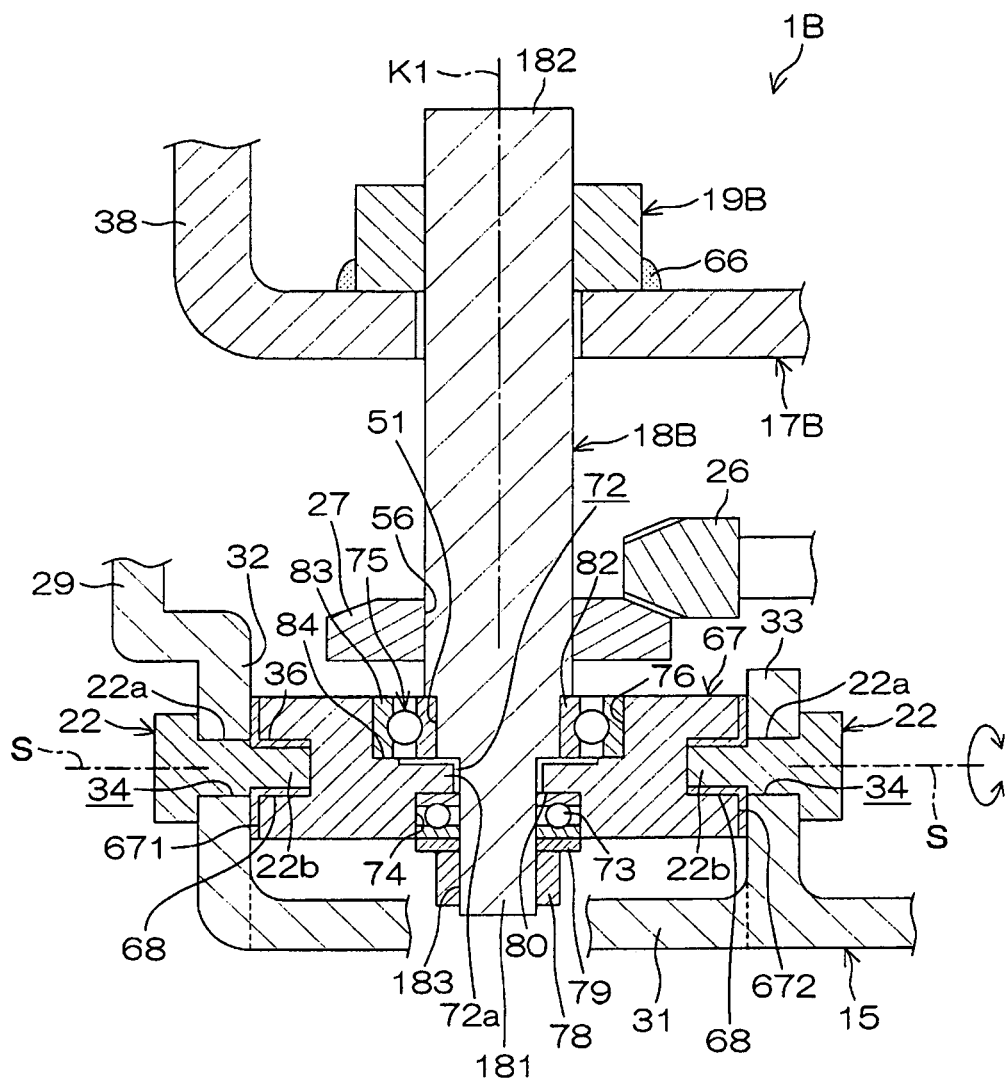
FIG. 5 is a schematic diagram of the other example of a steering apparatus relating to the present invention.

The load to the electrical motor in the further embodiment of the steering apparatus 1B in FIG. 5 can be reduced similar to that in FIG. 1, thereby reducing the size of the electrical motor.

The construction of the steering apparatus is described according to the above-mentioned construction, however it may be constructed that the electrical motor for the tilting adjustment and the electrical motor for the telescopic movement are different.

The above-mentioned steering apparatus 1, 1A, 1B are summarized as follows. The first aspect of the steering apparatus comprises a fixed bracket anchored to a vehicle body; a steering column supporting a steering shaft rotatably and supported swing-ably by said vehicle body around a tilting axis; a connecting mechanism connecting fixed fixing bracket and said steering column; said connecting mechanism includes a cradle connected to said steering column swing-ably around a first axis parallel to said tilting axis, a first member supported by said cradle swing-ably around said first axis in accordance with a swing of said cradle, and a second member supported by said fixed bracket swing-ably around a second axis parallel to said tilting axis; either one or the other of said first member and said second member is a screw shaft or a nut to be rotated relative to each other on a common axis intersecting both of said first axis and said second axis by being rotated by an electrical motor in order to achieve an tilting adjustment; a first restricting member restricting movement of said first member relative to said cradle along said common axis; and a second restricting member restricting movement of said second member relative to said fixed bracket along said common axis.

A second aspect of the steering apparatus includes a steering apparatus of the first aspect, wherein said steering column includes a lower tube; said connecting mechanism includes a first supporting shaft penetrated through said cradle and connected to a side part of said lower tube, and a second supporting shaft penetrated through said fixing bracket and connected to a side part of said second member; said first axis is a center axis of said first supporting shaft; and said second axis is a center axis of said second supporting shaft.

A third aspect of the steering apparatus includes features of the second aspect, wherein said lower tube includes a first tube to which said first shaft is connected, and a second tube fitting into a lower end of said first tube, in order to absorb energy during a collision of a vehicle.

Next, a controller for the steering apparatus according to the present invention will be explained. The controller controls the operation of the above-mentioned steering apparatus 1.

The screw shaft 18 has a screw portion on a cylindrical surface of the screw shaft 18, enabling the screw shaft to move relative to the nut 19 along the common axis K1 from one end to the other end of the screw portion in order to adjust the tilting angle θt of the steering column 6 and the steering wheel 2 from a lower end to an upper end. In other words, the movement of the screw shaft 18 is restricted by an un-illustrated restricting member to restrict the adjustment of the tilting angle θt from the lower end to the upper end.

An un-illustrated rotational angle sensor is mounted to detect a rotational angle of the screw shaft 18. The rotational sensor detects the rotational angle θk of the screw shaft 18 around the common axis K1 within 0 to 359 degrees.

The electrical motor 23 is controlled on a basis of a signal output from the rotational angle sensor of the screw shaft 18 and a signal output from an electronic controller 231. The electronic controller 231 includes an un-illustrated memory registering a lot of information. The electronic controller 231 is connected a operation panel 232 having an increasing button instructing to increase a tilting angle θt and a decreasing button instructing to decrease the tilting angle θt. When the driver pushes the increasing button, an instruction signal Ss is generated to increase the tilting angle θt. When the driver pushes the decreasing button, the instruction signal Ss is generated to decrease the tilting angle θt.

A symbol Q in FIG. 1 shows an intersection that passes point of a center line of the column 6 and a line perpendicular to the center line that passes through the tilting axis P. The tilting angle θt will be explained in a way that the tilting angle θt is increased when the steering wheel 2 and the steering column 6 are rotated upwardly in a gravity direction around the tilting axis P and the tilting angle θt is decreased when the steering wheel 2 and steering column 6 are rotated downwardly in the gravity direction around the tilting axis P in FIG. 1.

When the driver pushes the increasing button of the operation panel 232 to generate the instruction signal Ss to increase the tilting angle θt, the electronic controller 231 supplies positive (+) motor current Im to the electrical motor 23. On the other hand, when the driver pushes the decreasing button of the operation panel 232 to generate the instruction signal Ss to decrease the tilting angle θt, the electronic controller 231 supplies negative (−) motor current Im to the electrical motor 23.

The electrical motor 23 rotates in clockwise direction by receiving the positive motor current Im and rotates in counter-clockwise direction by receiving the negative motor current Im. Rotational torque τ from the electrical motor 23 is transmitted through the switching mechanism 24, the flexible tube Tu and the reduction mechanism 25 to the screw shaft 18. When the electrical motor 23 is rotated in clockwise direction the screw shaft 18 is rotated in clockwise direction viewed from the center line of the column 6 to the screw shaft 18. When the electrical motor 23 is rotated in counter-clockwise direction the screw shaft 18 is rotated in counter-clockwise direction. Upon the rotation of the screw shaft 18 relative to the nut 19, the torque τ is transformed into an axial force Jf.

The screw shaft axial force Jf moves the screw shaft 18 along the common axis K1 in an upward direction in FIG. 1 to raise the steering column 6 and the steering wheel 2. Upon the movement of the screw shaft 18, the reduction mechanism 25, the steering column 6, the steering shaft 5 and the steering wheel 2 are rotated around the tilting axis P as a whole to change the tilting axis θt. A geometrical relationship between an amount of the axial movement of the screw shaft 18 and the tilting angle θt is expressed by a predetermined arithmetic equation. Clockwise rotation of the screw shaft 18 causes the tilting angle θt to decrease. Counter-clockwise rotation of the screw shaft 18 causes the tilting angle θt to increase. The tilting angle θt is referred to as a reference tilting angle θts of zero degrees when the screw shaft 18 is moved to the lower end along the common axis K1.

A relationship of the tilting angle θt relative to component force Ef of the screw shaft axial force Jf in the normal direction will be explained referring to FIG. 6 and FIG. 7. Symbols P, Q, R, and S shown in FIG. 6A and FIG. 6B correspond to symbols P, Q, R, and S in FIG. 1 respectively. Symbols PQ, QR, and RS shown in FIG. 6A and FIG. 6B correspond to symbols PQ, QR, and RS in FIG. 1 respectively. The reference tilting angle θts lies on an axis Kj as shown in FIG. 6A and FIG. 6B. Symbol Sj shown in FIG. 6A and FIG. 6B represents a horizontal axis.

Figure 6A:
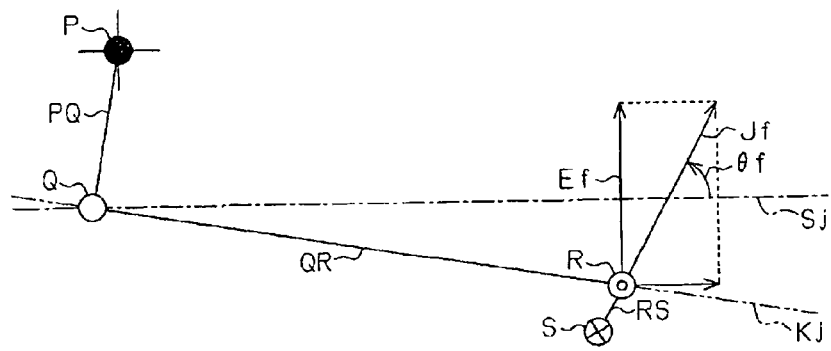
FIG. 6A is a kinematics diagram of a steering apparatus of one embodiment of the present invention to show a component force in a force of a screw shaft when a tilting angle is at a lowest end.
Figure 6B:
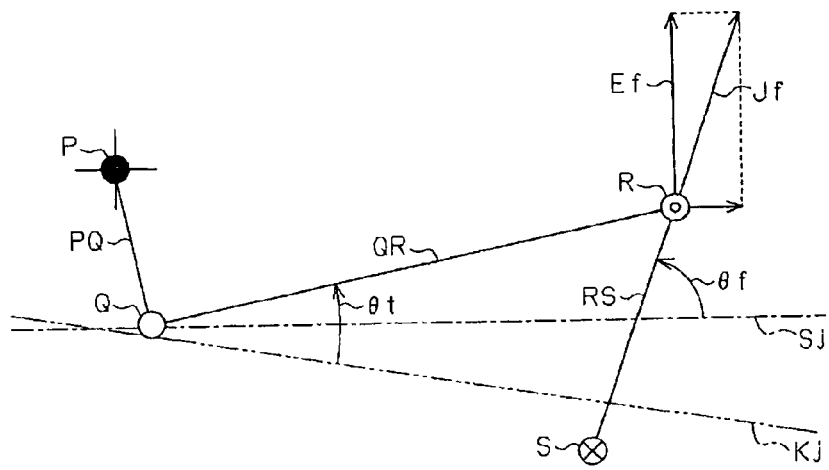
FIG. 6B is a kinematics diagram of the steering apparatus of one embodiment of the present invention to show a component force in a force of the screw shaft when the tilting angle is at an upper end.
Figure 7:
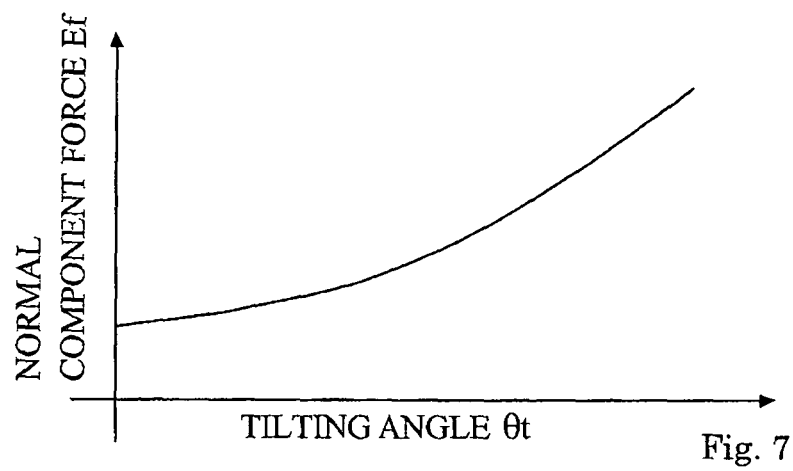
FIG. 7 is a graph showing a relationship of a component force of the screw shaft and the tilting angle in the steering apparatus of one embodiment of the present invention.

FIG. 6A shows a state where the screw shaft 18 reaches the lower end and the tilting angle θt is the reference tilting angle θts. FIG. 6B shows a state where the screw shaft 18 reaches the upper end and the tilting angle θt is increased from the state of the reference tilting angle θts of zero. When the tilting angle θt is increased, an angle θf defining a direction of the screw shaft axial force Jf relative to the horizontal axis Sj is increased. Accordingly, a normal component force Ef of the axial force Jf is increased as shown in FIG. 6B. Therefore, the ratio of the normal component force Ef to the screw shaft axial force Jf becomes larger as the tilting angle θt increases as shown in FIG. 7. On a basis of the phenomena, if the screw shaft axial force Jf is reduced, the increase of the normal component force Ef can be reduced.

The screw shaft axial force Jf at reduction of the tilting angle θt is affected by a downward force Kf due to the total weight of the members supported by the screw shaft in to the gravitational direction. When the screw shaft axial force Jf to reduce the tilting angle θt is smaller in comparison to the screw shaft axial force Jf to increase the tilting angle θt, the variation of the normal component force Ef in exchanging the operations of the increase of the tilting angle θt and the decrease of the tilting angle θt is reduced.

Figure 8:
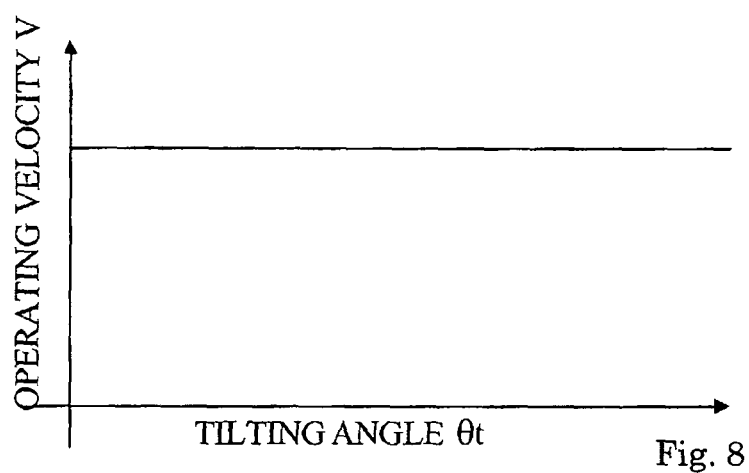
FIG. 8 is a graph showing a relationship of the tilting angle and an operating velocity thereof in the steering apparatus of one embodiment of the present invention.
Figure 9:
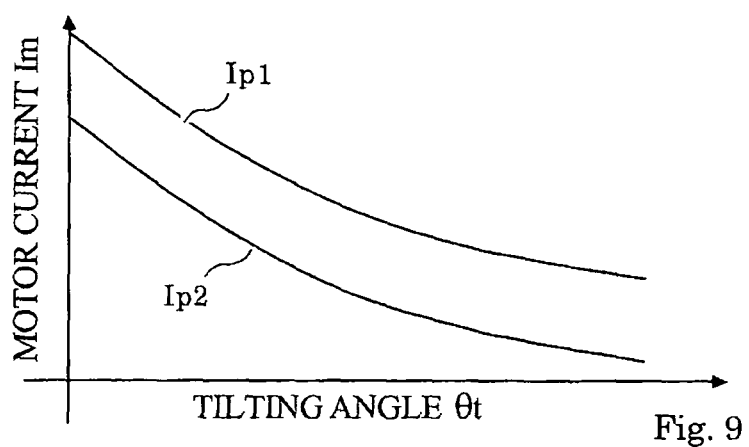
FIG. 9 is a map showing a relationship of the tilting angle and a motor current in the controller of the steering apparatus of one embodiment according to the present invention.

Next, a current map of the motor current will be explained referring to FIG. 8 and FIG. 9. The un-illustrated memory of the electronic controller 231 registers first current map Ip1 and second current map Ip2 shown in FIG. 9. The maps Ip1, Ip2 are previously determined in accordance with the tilting angle θt so that the normal component force Ef is constant with respect to the tilting angle θt and an operating velocity V of the tilting mechanism is constant as shown in FIG. 8. The first current map Ip1 is a map used for increasing the tilting angle θt, and the second current map Ip2 is a map used for decreasing the tilting angle θt. The motor current Im defined by the second current map Ip2 is smaller than the motor current Im defined by the first current map Ip1.

An operation of the controller for the steering apparatus according to the present invention will be explained.

The electronic controller 231 receives the instruction signal Ss from the operation panel 232. And also, the electronic controller 231 receives the rotational angle θk from the un-illustrated rotational angle sensor. The electronic controller 231 defines a variable amount of the tilting angle θt of the clockwise rotation of the screw shaft 18 as the positive displacement amount and the variable amount of the tilting angle θt of the counter-clockwise rotation of the screw shaft 18 as the negative displacement amount. The rotational angle θk relative to the lowest tilting angle θt is registered as a reference rotational angle θs in the un-illustrated memory. The electronic controller 231 calculates a total rotational angle θd of the screw shaft 18 around the common axis K1 by calculating a total amount of the positive displacement amount or the negative displacement amount of the rotational angle θk from the reference rotational angle θs.

The electronic controller 231 calculates the axial movement amount of the screw shaft 18 on a basis of the total rotational angle θd. The electronic controller 231 measures the tilting angle θt in accordance with the axial movement amount and the geometrical relationship of the screw shaft 18. The electronic controller 231 selects one of the first current map Ip1 and the second current map Ip2 in accordance with the instruction signal Ss received from the operation panel 232. The electronic controller 231 decides the motor current Im relative to the measured amount of the tilting angle θt in the selected current map as the current supplied to the electrical motor 23.

The electronic controller 231 also operates to learn a rotational angle θk as the reference rotational angle θs when a period in which the rotational angle θk does not vary while the electrical motor 23 supplies negative motor current Im to decrease the tilting angle θt exceeds a predetermined period tx.

Next a flow of a motor current deciding process in the electronic controller 231 will be explained based on a chart shown in FIG. 10. The electronic controller 231 executes to repeat the operation deciding the motor current at a predetermined frequency shown in FIG. 10.

In step S11 the electronic controller judges whether the instruction signal Ss is generated or not by the operation panel 232. When the judgment in step S11 is NO, the motor current deciding process is ended. When the judgment in step S11 is YES, the electronic controller measures the tilting angle θt on a basis of the rotational angle θk detected by the un-illustrated rotational angle sensor in a step S12.

In step S13, the electronic controller decides the motor current Im corresponding to the measured amount of the tilting angle θt in step S12 by referring to the current map selected in accordance with the instruction signal Ss.

In step S14, the electronic controller supplies the motor current Im decided in step S13 to the electrical motor 23.

A flow of a reference rotational angle learning process by the electronic controller 231 will be explained referring to FIG. 11. The electronic controller 231 executes the reference rotational angle learning process shown in FIG. 11 periodically and repeatedly in parallel with the motor current deciding process.

In step S21, after the motor current Im begins to be supplied, the electronic controller judges whether a non-variable period of the rotational angle θk exceeds a predetermined period tx. When the judgment is NO in step S21, the reference rotational angle learning process is ended.

When the judgment is YES in step S21, the electronic controller judges in step S22 whether the time after the non-variable period exceeds the predetermined period tx is a time after the tilting angle θt starts to decrease. When the judgment in step S22 is YES, it sets again the rotational angle θk detected by the un-illustrated rotational angle sensor as the reference rotational angle θs. When the judgment is NO in step S22, it progresses to step S24. The current supply of the motor current Im is stopped in step S24.

The controller of the steering apparatus 1 according to the present invention has following effects:

1. The steering apparatus 1 provides the electronic controller 231 defining the predetermined relationship between the tilting angle θt and the motor current Im of the electrical motor 23 and controls the motor current Im of the electrical motor 23 by the electronic controller 231.

Because of this construction, since the present invention controls the motor current Im of the electrical motor 23 by using the predetermined relationship between the tilting angle θt and the motor current Im of the electrical motor 23, it can control the operating velocity V of the tilting mechanism in accordance with the tilting angle θt. Because the predetermined relationship does not generate any variation of the operating velocity V of the tilting mechanism, which would cause difficulty to the tilting adjustment, an easy operation to adjust the tilting angle θt can be achieved. Since the electronic controller controls the motor current Im of the electrical motor 23 on a basis of the predetermined relationship, a calculating load calculating by the electronic controller 231 can be reduced in comparison with the construction of the prior art controlling a motor current of an electrical motor by a feedback control.

2. The electronic controller 231 includes the map defining the predetermined relationship between the tilting angle θt and the motor current Im of the electrical motor 23.

By this construction, it can calculate the motor current Im of the electrical motor 23 by applying the tilting angle θt to the motor current map in every instance. Therefore, it can reduce the calculating load calculating by the electronic controller 231 in comparison with the construction of the prior art calculating a motor current of an electrical motor by using an arithmetic equation.

3. The electronic controller 231 learns or recognizes the tilting angle θt as the reference tilting angle θs when the motor current Im is supplied so as to reduce the tilting angle θt and the period where the tilting angle θt in a state of being not variable is continued for the predetermined period tx.

The tilting angle θt recognized by the electronic controller 231 tends to shift from the actual existing tilting angle θt due to accumulations of mechanical shifts of the tilting mechanism and deterioration in the steering apparatus over time. When the operation of the tilting mechanism is restricted by contact with other mechanisms, the tilting angle θt is not changed even though motor current Im is supplied to the electrical motor 23. The electronic controller 231 learns the reference tilting angle θt based on this phenomenon. Therefore, a shift of the tilting angle θt recognized by the electronic controller 231 based on the reference tilting angle θt from the actual tilting angle θts is reliably eliminated.

4. The electronic controller 231 stops the motor current Im when the period where the amount of the rotational angle θk is not varied exceeds the predetermined period tx even though the motor current Im is being supplied to the electrical motor 23 in order to vary the tilting angle θt.

Two situations correspond to the phenomenon when the period where the amount of the rotational angle θk is not varied exceeds the predetermined period tx even though the motor current Im is supplied to the electrical motor 23:

(A) The screw shaft 18 reaches to the lower end even when the electrical motor 23 is driven to decrease the tilting angle θt, and (B) The screw shaft 18 reaches to the upper end even when the electrical motor 23 is driven to increase the tilting angle θt.

The controller for the steering apparatus can inhibit any possible deformation of the screw shaft 18 at the upper or the lower ends by stopping the electrical motor 23 in each of the above-identified situations (A) and (B).

While the invention has been described in detail with reference to the preferred embodiment, it will be apparent to those skilled in the art that the invention is not limited to the present embodiment, and that the invention may be realized in various other embodiments within the scope of the claims.

Figure 10:
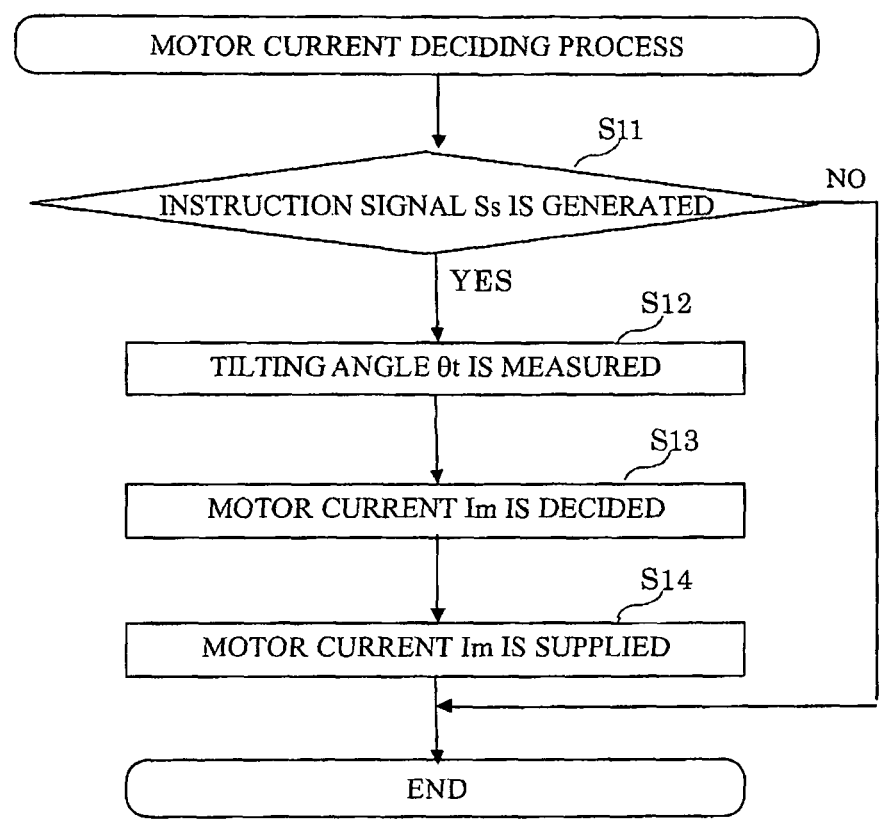
FIG. 10 is a flow chart showing a motor current deciding process executed by the controller of the steering apparatus of one embodiment according to the present invention.

For example, while the motor current Im in accordance with the tilting angle θt is decided referring to the motor current map as shown in FIG. 10, the electronic controller 231 may register an arithmetic equation calculating the motor current Im of the electrical motor 23 on a basis of the tilting angle θt. The electronic controller 231 can calculate the motor current Im by applying the instance tilting angle θt to the arithmetic equation. Thereby, the memory area of the electronic controller 231 can be reduced in comparison with the construction to register the motor current map previously and to calculate the motor current Im.

Figure 12A:
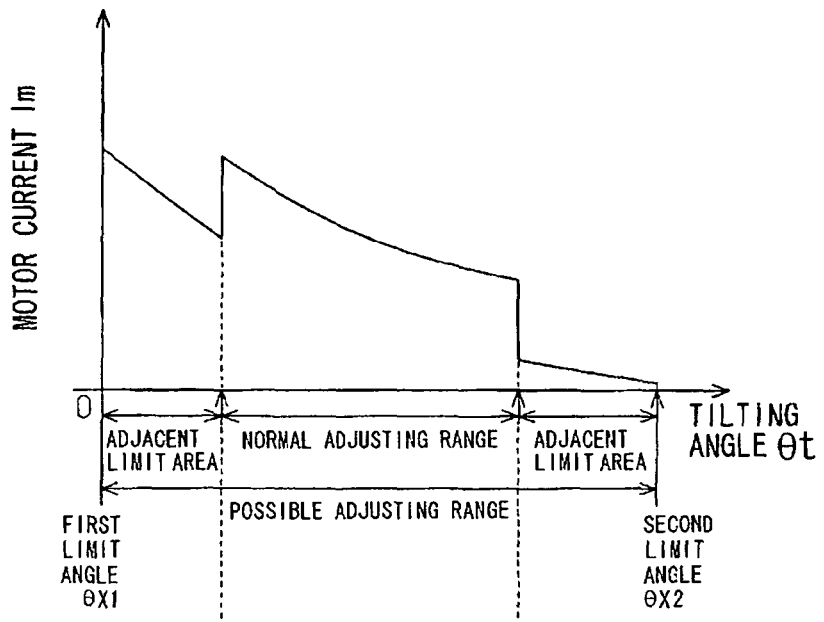
FIG. 12A is a map showing a relationship of a motor current and the tilting angle registered in the controller of the steering apparatus of another embodiment according to the present invention.
Figure 12B:
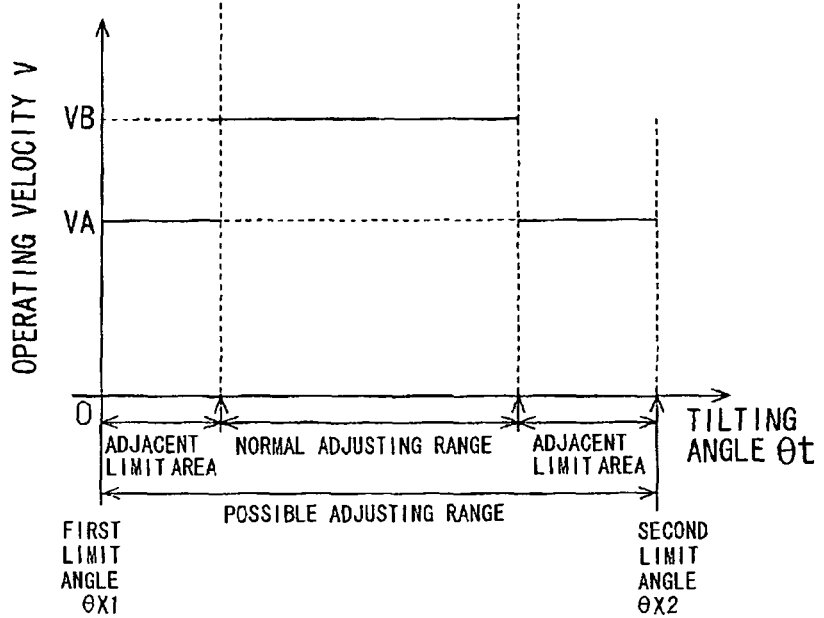
FIG. 12B is a graph showing a relationship of the tilting angle and an operating velocity thereof in the controller of the steering apparatus of another embodiment according to the present invention.

While the amount of the motor current Im is decided by using single motor current map and the screw shaft 18 is mechanically restricted at the upper or lowest end of its axial movement, however it may be also decided electrically by using first limit angle θx1 and second limit angle θx2 each of which is defined as an extreme end of the possible adjusting range of the tilting angle θt as shown in FIG. 12A and FIG. 12B. A normal adjusting range of the tilting angle θt is defined between two adjacent limit areas, each of the two adjacent limit areas is defined by an area where the difference of the tilting angle θt from the first limit angle θx1 or the second limit angle θx2 is a predetermined amount. In this example, the operating velocity V is defined as an operating velocity VA where the tilting angle θt is within the adjacent limit areas and the operating velocity V is defined as an operating velocity VB where the tilting angle θt is within the normal adjusting range. The electronic controller 231 registers a motor current map having three different curves as shown in FIG. 12A which is a predetermined relationship between the tilting angle θt and the motor current Im to keep the operating velocity VA under the operating velocity VB. Therefore, according to this example, the controller for the steering apparatus of the present invention can have a small possibility of deforming the screw shaft 18 because the operating velocity of the tilting mechanism is set to be small where the tilting angle θt is within the adjacent limit areas in comparison with the mechanical restriction against the screw shaft 18, which has a larger possibility of deforming the screw shaft 18.

Figure 11:
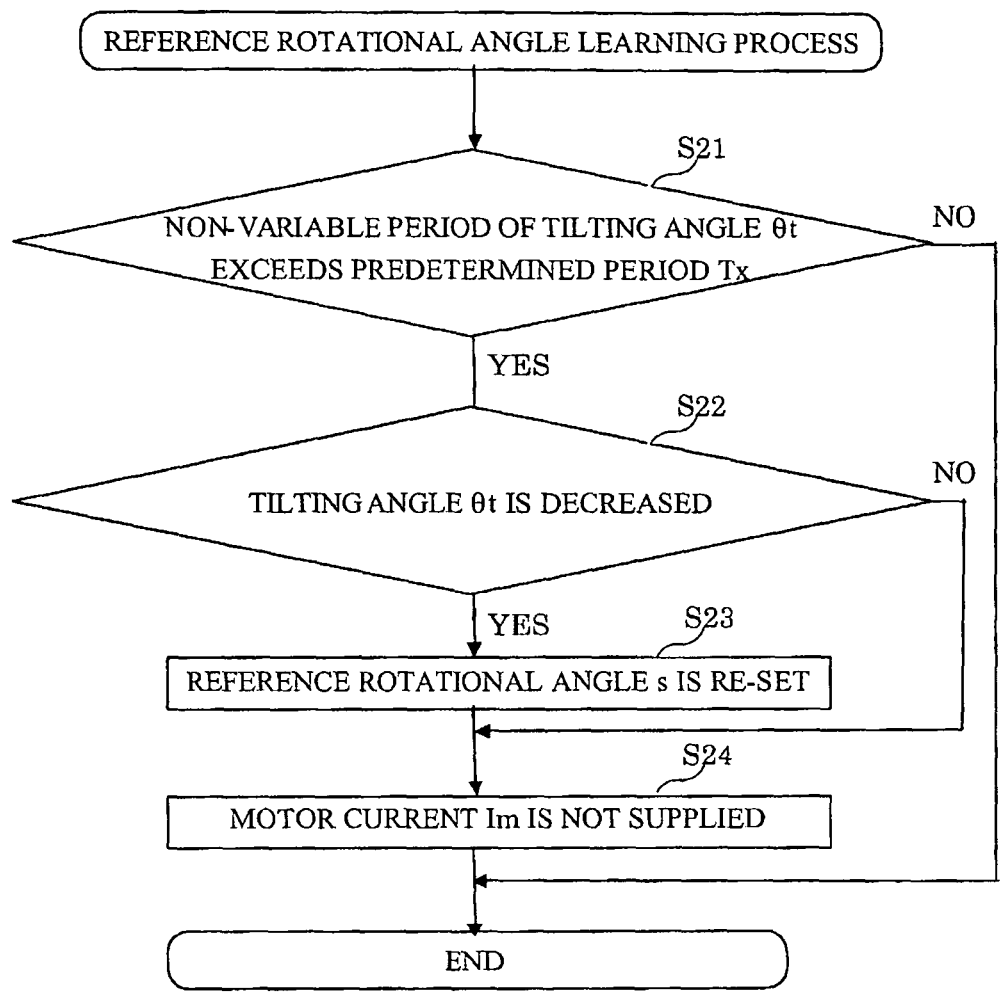
FIG. 11 is a flow chart showing a reference rotational angle learning process executed by the controller of the steering apparatus of one embodiment according to the present invention.

While the electronic controller 231 learns the tilting angle θt as the reference tilting angle θts when the motor current Im is supplied to the electrical motor 23 to reduce the tilting angle θt and a period where the tilting angle θt does not vary exceeds a predetermined period, shown in FIG. 11, it may learn the rotational angle θk as the reference rotational angle θs when the motor current Im is supplied to the electrical motor 23 to increase the tilting angle θt and a period where the tilting angle θt does not vary exceeds the predetermined period.

By this example, the shift of the tilting angle θt from the actual tilting angle θt is reliably eliminated.

While the electronic controller 231 learns the reference rotational angle θs at the tilting adjustment of the tilting angle θt in accordance with the operation of the driver, it may learn the reference rotational angle θs when the amount of the tilting angle θt is automatically increased to maximum amount in order that the driver can easily ride on the vehicle.

While the electronic controller 231 detects the rotational angle θk of the screw shaft 18, it may also calculate the tilting angle θt based on assuming a rotational angle of a rotor of the electrical motor 23 from an induced voltage at each phase of the electrical motor 23. Thereby, the electronic controller 231 can decide the motor current Im supplied to the electrical motor 23 without using the rotational angle sensor detecting the tilting angle θt.

While the steering apparatus 1 has the steering shaft 5 coupled mechanically with the power steering mechanism, it may also be constructed with a steer-by-wire steering mechanism controlling the steering mechanism with a power source of the electrical motor and without coupling to the steering shaft 5.

While the electronic controller 231 measures the tilting angle θt by detecting the rotational angle θk of the screw shaft 18 as the amount of the rotation, it may also measure the tilting angle θt by detecting a displacement amount of the screw shaft 18 along the common axis K1.

While the electronic controller 23 has the un-illustrated rotational angle sensor for a detecting member measuring the tilting angle θt, it may also have a rotational angle sensor detecting a rotational angle of the rotor of the electrical motor 23 or the tilting angle θt around the tilting axis P directly.

While the electronic controller 231 learns the reference rotational angle θs, it may also learn a reference tilting angle θts when the screw shaft 18 is in the lowest end for detecting the tilting angle θt directly by the rotational angle sensor.

While the steering apparatus 1 has the screw nut 18 rotated relative to the nut 19 in order to vary the tilting angle θt, it may also be constructed to rotate the steering column 6 directly around the tilting axis P to vary the tilting angle θt.

While the steering apparatus 1 has the screw shaft 18 supporting the steering column 6, it may also be constructed so that the steering column 6 is supported by a rack shaft of the rack and pinion steering mechanism to vary the tilting angle θt by rotating a pinion gear.

While the electronic controller 231 decides the tilting angle θt at the lowest end of the screw shaft 18 as the reference tilting angle θts, it may also decide as the reference tilting angle θts the tilting angle t at the time when the center line of the steering column 6 is on a line parallel to the horizontal line.

What is claimed is:

1. A controller for a steering apparatus wherein
said steering apparatus comprises a tilting mechanism adjusting a tilting angle of a steering wheel, and an electrical motor driving the tilting mechanism;
said controller comprises an arithmetic member defining a predetermined relationship between said tilting angle and a supplying current to said electrical motor so that an operating velocity of the tilting mechanism is constant;
said controller controls said supplying current to said electrical motor by using said arithmetic member;
said arithmetic member includes maps defining a predetermined relationship between said tilting angle and said supplying current to said electrical motor;
said maps include a first current map that defines the predetermined relationship between said tilting angle and said supplying current to said motor for increasing the tilting angle, and a second current map that defines the predetermined relationship between said tilting angle and said supplying current to said motor for decreasing the tilting angle; and said supplying current defined by the second current map is smaller than said supplying current defined by the first current map.

2. The controller for the steering apparatus according to claim 1, wherein said arithmetic member includes arithmetic equation calculating said supplying current to said electrical motor on a basis of said tilting angle.

3. The controller for the steering apparatus according to claim 2, wherein said steering apparatus includes a supporting member supporting said steering wheel, and a restricting member restricting a possible adjusting range of said tilting angle as a rotational angle of said supporting member;

said controller for said steering apparatus defines each angle at both ends of said possible adjusting range of the tilting angle within said possible adjusting range as first limit angle or second limit angle, defines as an adjacent limit area a range where a difference of said tilting angle from said first limit angle or said second limit angle is under a predetermined amount, and defines a range other than said adjacent limit areas within said possible adjusting range as a normal adjusting range; and said arithmetic member defines an operating velocity where said tilting angle is within said adjacent limit areas as an operating velocity VA and defines said operating velocity where the tilting angle is within the normal adjusting range as an operating velocity VB, and includes such a predetermined relationship between said tilting angle and said supplying current to said electrical motor that said operating velocity VA is under the operating velocity VB.

4. The controller for the steering apparatus according to claim 3, wherein said controller learns said tilting angle as a reference tilting angle when said current is supplied to said electrical motor and it is continued that a period where said tilting angle is not varied exceeds a predetermined period.

5. The controller for the steering apparatus according to claim 4, wherein said tilting angle is assumed based on an induced voltage of said electrical motor.

\* \* \* \* \*